(12) United States Patent
Zhuo et al.

(10) Patent No.: US 10,666,056 B2
(45) Date of Patent: May 26, 2020

(54) PHOTOVOLTAIC AIR-CONDITIONING SYSTEM AND PHOTOVOLTAIC AIR CONDITIONER HAVING SAME

(71) Applicant: Gree Electric Appliances, Inc. of Zhuhai, Zhuhai, Guangdong (CN)

(72) Inventors: Senqing Zhuo, Guangdong (CN); Xin Ma, Guangdong (CN); Jianbo You, Guangdong (CN); Fashun Li, Guangdong (CN); Jiaxin Zhang, Guangdong (CN)

(73) Assignee: Gree Electric Appliances, Inc. of Zhuhai, Zhuhai, Guangdong (CN)

( * ) Notice: Subject to any disclaimer, the term of this patent is extended or adjusted under 35 U.S.C. 154(b) by 323 days.

(21) Appl. No.: 15/512,791

(22) PCT Filed: Jul. 22, 2015

(86) PCT No.: PCT/CN2015/084752
§ 371 (c)(1),
(2) Date: Jul. 26, 2017

(87) PCT Pub. No.: WO2016/041413
PCT Pub. Date: Mar. 24, 2016

(65) Prior Publication Data
US 2017/0358926 A1    Dec. 14, 2017

(30) Foreign Application Priority Data

Sep. 19, 2014    (CN) .......................... 2014 1 0484082

(51) Int. Cl.
*H02J 3/38* (2006.01)
*H02S 40/32* (2014.01)
(Continued)

(52) U.S. Cl.
CPC ............ *H02J 3/383* (2013.01); *F24F 5/0046* (2013.01); *H02M 1/4208* (2013.01);
(Continued)

(58) Field of Classification Search
CPC .. H02J 3/383; F24F 5/0046; F24F 2005/0067; H02M 1/4208; H02M 3/33569; H02M 1/44; H04S 40/32; F04B 35/04
See application file for complete search history.

(56) References Cited

U.S. PATENT DOCUMENTS

| 5,560,218 A * | 10/1996 | Jang ...................... F25B 49/025 |
| | | 323/906 |
| 2014/0306526 A1* | 10/2014 | Fontana ................... H02J 3/00 |
| | | 307/24 |
| 2015/0142204 A1* | 5/2015 | Wang ..................... H02J 9/062 |
| | | 700/300 |

FOREIGN PATENT DOCUMENTS

| CN | 202019227 | 10/2011 |
| CN | 102480167 | 5/2012 |

(Continued)

*Primary Examiner* — Daniel Kessie
(74) *Attorney, Agent, or Firm* — Brandon V. Zuniga; James R. Gourley; Carstens & Cahoon, LLP

(57) ABSTRACT

Disclosed are a photovoltaic air-conditioning system and a photovoltaic air conditioner having same. The photovoltaic air-conditioning system comprises a photovoltaic battery, a switch module, an inverter circuit, a rectification circuit and a compressor inverter; an input end of the switch module is electrically connected to a power grid; a first output end of the switch module is electrically connected to a first input/output end of the inverter circuit; a second output end of the switch module is electrically connected to an input end of the rectification circuit; an output end of the rectification circuit is electrically connected to an input end of the compressor inverter; the input end of the switch module is (Continued)

not simultaneously conducting with both of the first output end and the second output end of the switch module.

17 Claims, 2 Drawing Sheets

(51) Int. Cl.
*F24F 5/00* (2006.01)
*H02M 1/42* (2007.01)
*H02M 3/335* (2006.01)
*F04B 35/04* (2006.01)
*H02M 1/44* (2007.01)

(52) U.S. Cl.
CPC ......... *H02M 3/33569* (2013.01); *H02S 40/32* (2014.12); *F04B 35/04* (2013.01); *F24F 2005/0067* (2013.01); *H02M 1/44* (2013.01); *Y02E 10/563* (2013.01)

(56) References Cited

FOREIGN PATENT DOCUMENTS

| | | |
|---|---|---|
| CN | 103115405 | 5/2013 |
| CN | 104110795 | 10/2014 |
| CN | 204043127 | 12/2014 |
| CN | 104319761 | 1/2015 |
| CN | 204118735 | 1/2015 |
| WO | 2012/165365 | 12/2012 |

* cited by examiner

PHOTOVOLTAIC AIR-CONDITIONING SYSTEM AND PHOTOVOLTAIC AIR CONDITIONER HAVING SAME

CROSS REFERENCE TO RELATED APPLICATIONS

This application is a continuation application of PCT Patent Application No. PCT/CN2015/084752, entitled "Photovoltaic Air-conditioning System and Photovoltaic Air Conditioner Having Same", filed on Jul. 22, 2015, which claims priority to Chinese Patent Application No. 201410484082.1, entitled "Photovoltaic Air-conditioning System and Photovoltaic Air Conditioner Having Same", filed Sep. 19, 2014, the entire contents of which are incorporated herein by reference.

TECHNICAL FIELD

The present disclosure relates to the technical field of household appliances, more particularly, to a photovoltaic air-conditioning system and a photovoltaic air conditioner having same.

BACKGROUND

The photovoltaic air-conditioning system with grid-connecting and inverting functions in the prior art is shown in FIG. 1, which is configured to make it convenient for the photovoltaic battery to supply power for a main circuit of an air conditioner, and to have a simple circuit easily implemented. Take a single-phase grid-connected system as an example, when the photovoltaic battery is electrically connected to the photovoltaic air-conditioning system, the electric energy is transferred to the grid-connected inverter circuit and the compressor inverter of the air conditioning system through the voltage boost circuit and direct current (DC) buses. The grid-connected inverter circuit feeds the electric energy of the photovoltaic battery to the power grid. The compressor inverter of the air conditioning system converts direct current in the DC buses to alternating current (AC) which is required for speed adjusting of the compressor, so as to drive the compressor to operate.

When the compressor of the air conditioner is driven to operate by electric energy from the power grid, the rectification and PFC (Power Factor Correction) circuit converts AC output from the power grid to DC, and ensures the electric energy input from the power grid to have a constant unity-power factor. When the grid-connected inverter circuit performs grid-connecting and inverting, rectification is not performed, so that the rectification and PFC circuit doesn't work and no electric energy is input from the power grid. When the grid-connected inverter circuit doesn't perform grid-connecting and inverting, the rectification and PFC circuit inputs electric energy from the power grid and drives the compressor of the air conditioner to operate.

With the photovoltaic air-conditioning system above, it is realized to supply power for the main circuit of the air conditioner by the photovoltaic battery. However, when grid-connecting and inverting are performed, the down bus of the DC buses is still connected to the live wire and the neutral wire of the power grid through the rectification bridge, which will easily cause the grid-connected inverter current to flow into the down bus through the rectification bridge, and thus interfering with normal control of the grid-connected inverter current.

SUMMARY OF THE INVENTION

In view of the above, it is necessary to provide a photovoltaic air-conditioning system and a photovoltaic air conditioner having same to solve the problem in the existing photovoltaic air-conditioning system of interfering with normal control of the grid-connected inverter current.

The objective of the present disclosure is achieved by providing a photovoltaic air-conditioning system, comprising a photovoltaic battery, a switch module, an inverter circuit, a rectification circuit and a compressor inverter; wherein, an input end of the switch module is electrically connected to a power grid;

a first output end of the switch module is electrically connected to a first input/output end of the inverter circuit;

a second output end of the switch module is electrically connected to an input end of the rectification circuit;

an output end of the rectification circuit is electrically connected to an input end of the compressor inverter;

the input end of the switch module is not simultaneously conducting with both of the first output end and the second output end of the switch module;

when the input end of the switch module is conducting with the first output end of the switch module, the power grid is connected to the photovoltaic battery;

when the input end of the switch module is conducting with the second output end of the switch module, the power grid is connected to a compressor of an air conditioner.

In one of the embodiments, the switch module comprises a first switch and a second switch;

one end of the first switch and one end of the second switch, both of which are configured to be input ends of the switch module, are connected electrically with the power grid;

another end of the first switch, which is configured to be the first output end of the switch module, is electrically connected to the first input/output end of the inverter circuit;

another end of the second switch, which is configured to be the second output end of the switch module, is electrically connected to the input end of the rectification circuit.

In one of the embodiments, the switch module comprises a single-pole double-throw switch;

a common end of the single-pole double-throw switch acts as the input end of the switch module and is connected to the grid;

a first fixed contact of the single-pole double-throw switch acts as the first output end of the switch module and is electrically connected with the first input/output end of the inverter circuit;

a second fixed contact of the switch module acts as the second output end of the switch module and is electrically connected to the input end of the rectification circuit.

In one of the embodiments, the photovoltaic air-conditioning system further comprises a third switch, wherein, the third switch is electrically connected between the second input/output end of the inverter circuit and the input end of the compressor inverter.

In one of the embodiments, the photovoltaic air-conditioning system further comprises a voltage boost circuit and a DC/DC isolation circuit, wherein, an input end of the voltage boost circuit is electrically connected with an output end of the photovoltaic battery;

the DC/DC isolation circuit is electrically connected between the output end of the voltage boost circuit and a second input/output end of the inverter circuit.

In one of the embodiments, the DC/DC isolation circuit comprises an isolation transformer;

a primary coil of the isolation transformer is electrically connected to the output end of the voltage boost circuit;

a secondary coil of the isolation transformer is electrically connected to the second input/output end of the inverter circuit.

In one of the embodiments, the photovoltaic air-conditioning system further comprises a power factor correction circuit, wherein, the power factor correction circuit is electrically connected between the input end of the compressor inverter and the output end of the rectification circuit.

In one of the embodiments, the photovoltaic air-conditioning system further comprises a controller;

the controller is electrically connected to the switch module and the third switch respectively, and is configured to control the input end of the switch module to be conducting or non-conducting with the first output end or the second output end of the switch module, and to control the third switch to close or open.

In one of the embodiments, the photovoltaic air-conditioning system further comprises a first energy storage capacitor, a second energy storage capacitor and a third energy storage capacitor, wherein, the first energy storage capacitor is electrically connected between an output end of the DC/DC isolation circuit and a second input/output end of the inverter circuit;

the second energy storage capacitor is electrically connected between the output end of the voltage boost circuit and an input end of the DC/DC isolation circuit;

the third energy storage capacitor is electrically connected between the output end of the Power Factor Correction circuit and the input end of the compressor inverter.

Correspondingly, the present invention further provides a photovoltaic air conditioner comprising any one of the photovoltaic air-conditioning systems above.

The photovoltaic air-conditioning system above and the photovoltaic air conditioner having same have the beneficial effects as follows: the photovoltaic air-conditioning system comprises a photovoltaic battery, a switch module, an inverter circuit, a rectification circuit and a compressor inverter; wherein an input end of the switch module is electrically connected to the power grid; the first output end of the switch module is electrically connected to the first input/output end of the inverter circuit; the second output end of the switch module is electrically connected to an input end of the rectification circuit; an output end of the rectification circuit is electrically connected to an input end of the compressor inverter; wherein, the input end of the switch module is not simultaneously conducting with both of the first output end and the second output end of the switch module; when the input end of the switch module is conducting with the first output end of the switch module, the power grid is connected to the photovoltaic battery of the photovoltaic air-conditioning system; when the input end of the switch module is conducting with the second output end of the switch module, the power grid is connected to a compressor of an air conditioner. By means of the switch module provided in the photovoltaic air-conditioning system, the rectification circuit and the inverter circuit are not simultaneously conducting with the power grid, thereby avoiding mutual influence between the grid-connecting and inverting unit and the rectifying unit of the driving system of the air conditioner, preventing interference with normal control of the grid-connected inverter current, and effectively solving the problem in the existing photovoltaic air-conditioning system of interfering with normal control of the grid-connected inverter current.

DETAILED DESCRIPTION OF THE PREFERRED EMBODIMENTS

In order to make the technical schemes of the present disclosure more apparent, the present disclosure will be described in more details with reference to the accompanying figures and preferred embodiments.

Figure 1:
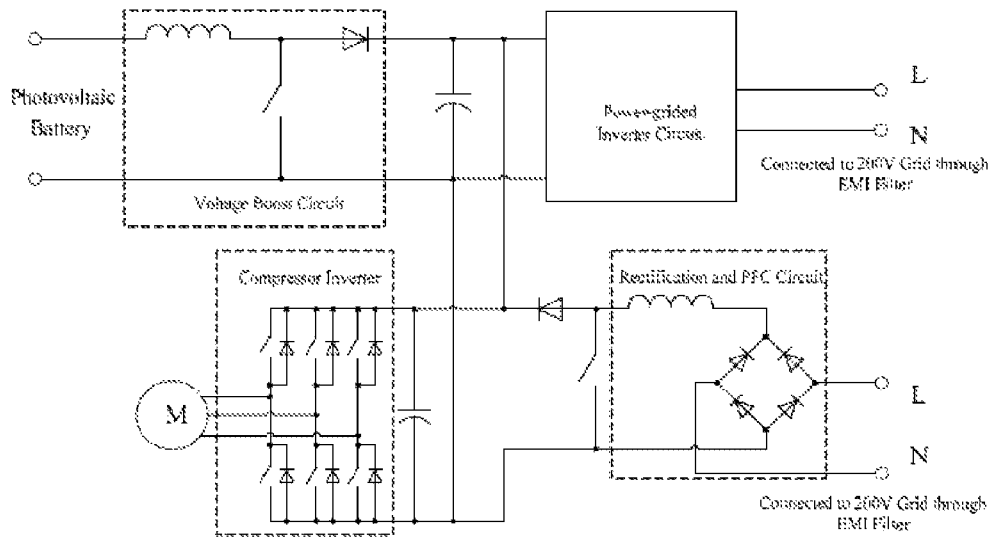
FIG. 1 is a circuit topology of the photovoltaic air-conditioning system in the prior art.

As shown in FIG. 1, in the photovoltaic air-conditioning system in the prior art, when the photovoltaic battery performs grid-connecting and inverting, the live wire and the neutral wire, through which the rectification current is input, are not completely disconnected from the power grid, and the down bus of the DC buses is still connected to the live wire and the neutral wire of the power grid through the rectification bridge, which will easily cause the grid-connected inverter current to flow into the down bus through the rectification bridge, thereby causing the live wire current and the neutral wire current output from the grid-connected inverter circuit to be different, and interfering normal control for the grid-connected inverter current.

Therefore, in order to avoid the difference between the live wire current and the neutral wire current, and avoid interference with normal control for the grid-connected inverter current, the present invention provides a detailed embodiment of the photovoltaic air-conditioning system, which comprises a photovoltaic battery, a switch module, an inverter circuit, a rectification circuit and a compressor inverter.

Wherein, an input end of the switch module is electrically connected to a power grid; a first output end of the switch module is electrically connected to a first input/output end of the inverter circuit; a second output end of the switch module is electrically connected to an input end of the rectification circuit.

Wherein, the input end of the switch module is not simultaneously conducting with both of the first output end and the second output end of the switch module.

When the input end of the switch module is conducting with the first output end of the switch module, the power grid is connected to the photovoltaic battery, thereby the photovoltaic battery performs grid-connecting and inverting.

When the input end of the switch module is conducting with the second output end of the switch module, the power grid is connected to a compressor of an air conditioner, which allows the power grid to supply power for the compressor of the air conditioner and drive the air conditioner to operate normally when the output power of the photovoltaic battery is not large enough to drive the air conditioner to operate.

An output end of the rectification circuit is electrically connected to an input end of the compressor inverter, so that the power grid supplies power for the air conditioner of the air conditioner and drives the air conditioner to operate normally. The AC output from the power grid is rectified and converted to DC which is applicable for the compressor inverter of the air conditioning system. Then the compressor inverter of the air conditioning system converts DC to AC, which is required for motor speed adjusting of the compressor of the air conditioner, so as to drive the compressor to operate.

Wherein, the rectification circuit is preferably to be a bridge rectifier, which is formed by four diodes through every two diodes butted to one another.

The switch module is provided in the photovoltaic air-conditioning system, and the input end of the switch module is not simultaneously conducting with both of the first output end and the second output end of the switch module, thereby the rectification circuit, which is connected to the compressor inverter of the air conditioning system, and the inverter circuit, which is connected to the photovoltaic battery, are not simultaneously conducting with the power grid.

When grid-connecting and inverting is performed, the input end of the switch module is conducting with the first output end, however, the input end of the switch module is disconnected from the second output end, so the N (Neutral) wire and the L (live) wire, through which the rectification current is input, are completely disconnected from the power grid, and the down bus of the DC buses will not connected to the L (live) wire and the N (neutral) wire of the power grid through the rectification bridge, which prevents the grid-connected inverter current from flowing into the down bus through the rectification circuit, avoids mutual influence between the grid-connecting and inverting unit, and the rectifying unit of the driving system of the air conditioner, prevents interference with normal control for the grid-connected inverter current, and effectively solves the problems in the existing photovoltaic air-conditioning system of interfering with normal control of the grid-connected inverter current.

Figure 2:
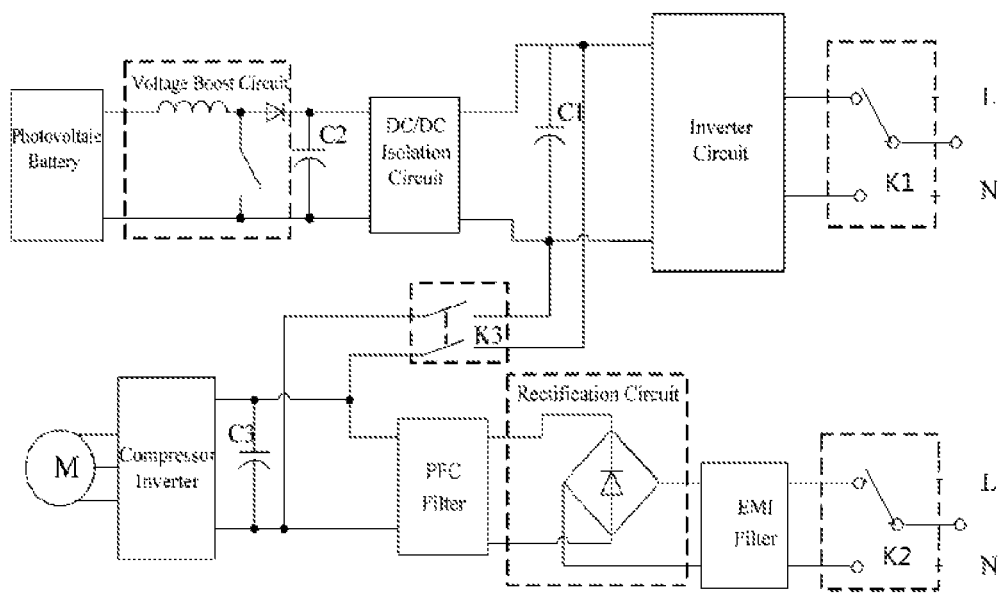
FIG. 2 is a circuit topology of the photovoltaic air-conditioning system according to an embodiment of the present invention.

It should be specified that, as shown in FIG. 2, the switch module comprises a first switch K1 and a second switch K2.

One end of the first switch K1 and one end of the second switch K2, both of which are configured to be input ends of the switch module, are connected electrically with the power grid.

The other end of the first switch K1, which is configured to be the first output end of the switch module, is electrically connected to the first input/output end of the inverter circuit.

The other end of the second switch K2, which is configured to be the second output end of the switch module, is electrically connected to the input end of the rectification circuit.

The first switch K1 is electrically connected between the inverter circuit and the power grid. Through turning on or turning off the first switch K1, the connection between the inverter circuit and the power grid is controlled to be turned on or turned off. The second switch K2 is electrically connected between the rectification circuit and the power grid. Through turning on or turning off the second switch K2, the connection between the rectification circuit and the power grid is controlled to be turned on or turned off.

Wherein, the first switch K1 and the second switch K2 cannot be turned on simultaneously. That is to say, when the grid-connected inverter circuit performs grid-connecting and inverting, the electric energy of the photovoltaic battery is connected to the grid through the grid-connected inverter circuit. So through controlling the first switch K1 to turn on, the grid-connected inverter circuit is connected to the grid. Simultaneously, through controlling the second switch K2 to turn on, the rectification circuit is disconnected to the grid, thereby prevents the grid-connected inverter current from flowing into the down bus of the DC buses through the rectification circuit, avoids influences between the driving system of the air conditioner (the circuit formed by the compressor inverter of the air conditioning system and the rectification circuit) and the grid-connecting and inverting unit (the circuit formed by the photovoltaic battery, the grid-connected inverter and the gird), and prevents back flow of the grid-connected inverter current from interfering with normal control of the grid-connected inverter current.

Additionally, it should be specified that, the switch module may comprise a single-pole double-throw switch. Through providing the single-pole double-throw switch, the common end of the single-pole double-throw switch acts as the input end of the switch module and is connected to the grid.

A first fixed contact of the single-pole double-throw switch acts as the first output end of the switch module and is electrically connected with the first input/output end of the inverter circuit.

A second fixed contact of the switch module acts as the second output end of the switch module and is electrically connected to an input end of the rectification circuit.

The common end of the single-pole double-throw switch cannot be connected to the two fixed contacts (the first fixed contact and the second fixed contact) thereof simultaneously, and the common end of the single-pole double-throw switch acts as the input end of the switch module and is connected with the grid, therefore, through controlling the common end of the single-pole double-throw switch to be connected to the first fixed contact, or through controlling the common end of the single-pole double-throw switch to be connected to the second fixed contact, the inverter circuit is connected to the power grid, or the rectification circuit is connected to the grid, thereby avoiding influences between the driving system of the air conditioner and the grid-connecting and inverting unit. What's more, the function can be realized only by one single-pole double-throw switch, and the circuit is simple and easy to realize, and the cost is low.

It should be specified that, the output AC power of the grid may be single phase power or three-phase power. That's to say, the grid may be a single phase grid or a three-phase grid. The embodiments of the photovoltaic air-conditioning system of the present invention are specified with the single phase grid, but the present invention should not be limited to be the embodiments specified with single phase grid.

Further, as shown in FIG. 2, in an embodiment of the present invention, the photovoltaic air-conditioning system further comprises a voltage boost circuit and a DC (Direct Current)/DC isolation circuit.

The input end of the voltage boost circuit is electrically connected with the output end of the photovoltaic battery. The voltage boost circuit is configured to boost the lower DC voltage output from the photovoltaic battery and convert it to be higher DC voltage, and the higher DC voltage is input into the DC/DC isolation circuit.

The DC/DC isolation circuit is electrically connected between the output end of the voltage boost circuit and the second input/output end of the gird-connected inverter circuit, so that the front stage and the downstream stage of the grid-connected inverter circuit are isolated, and that the DC/DC isolation circuit is completely isolated, thereby realizing isolation between the photovoltaic battery and the grid. In this way, the earth leakage current of the photovoltaic battery will not flow into the inverter circuit, thereby avoiding increment of a common mode component to ground of the gird-connected inverter current, and effectively solving the problem in the existing photovoltaic air-conditioning system that the ground leakage current influences the safety of the grid.

Wherein, in one of the embodiments, the DC/DC isolation circuit comprises an isolation transformer. The primary coil of the isolation transformer is electrically connected to the output end of the voltage boost circuit. The secondary coil of the isolation transformer is electrically connected to the second input/output end of the inverter circuit. The DC power boosted by the voltage boost circuit is converted to be DC voltage, which is applicable for grid connecting and inverting and is input into the inverter circuit for gird connecting and inverting. The front stage and the downstream stage of the inverter circuit are completely isolated by the isolation transformer, thereby realizing the isolation between the photovoltaic battery and the grid easily and conveniently. The embodiment has a simple structure, is convenient and easy to realize.

Preferably, the isolation transformer is a high frequency isolation transformer.

Through the first switch K1, the first input/output end of the inverter circuit is electrically connected to the grid. The inverter circuit inverts and converts the DC power converted by the DC/DC isolation circuit to be AC power with the same frequency and phase as the grid, and the AC power is input into the grid, thereby realizing the grid connecting of the photovoltaic battery.

It should be specified that the voltage boost circuit, the DC/DC isolation circuit and the inverter circuit are electrically connected in sequence through DC buses. The voltage boost circuit may be a booster, a DC/DC isolated boosting circuit, or a combined circuit of a booster and a DC/DC isolated boosting circuit.

On one hand, the voltage boost circuit is configured to boost voltage, and on the other hand, is configured for MPPT (Maximum Power Point Tracking). The voltage boost circuit comprises a MPPT module, so that the voltage boost circuit has the function of maximum power point tracking. The MPPT module samples the voltage and the current output from the photovoltaic battery, calculates the power, controls and tracks the point of the maximum power output by the photovoltaic battery, thereby ensuring the power supply efficiency of the photovoltaic battery.

Figure 3:
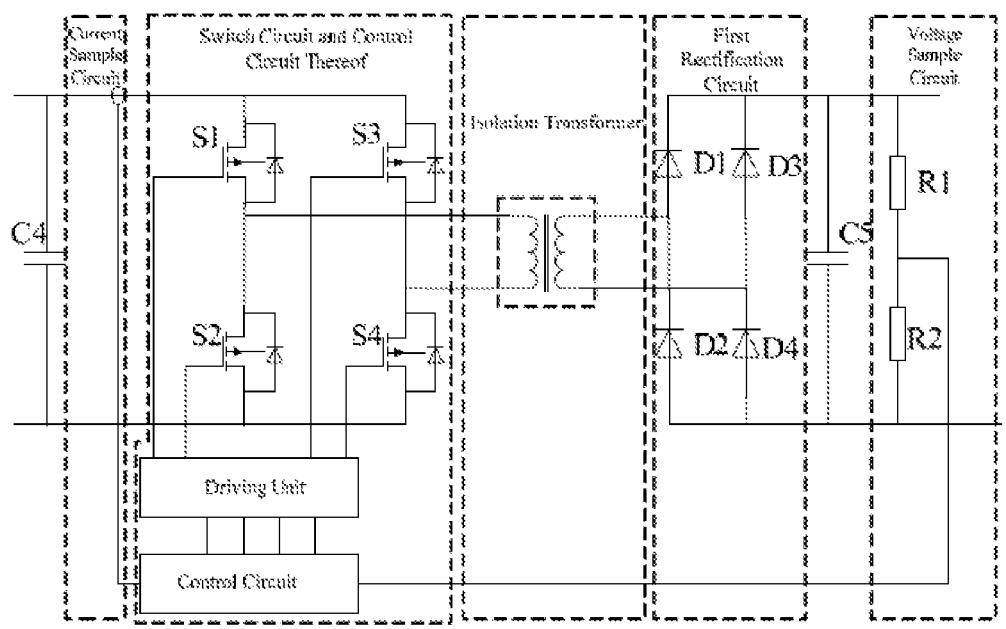
FIG. 3 is a topology of the DC/DC isolation circuit of the photovoltaic air-conditioning system according to an embodiment of the present invention.

Further, as shown in FIG. 3, in one of the embodiments of the photovoltaic air-conditioning system, the DC/DC isolation circuit further comprises a first rectification circuit. The first rectification circuit is electrically connected between the secondary coil of the isolation transformer and the second input/output end of the inverter circuit. Specifically:

Preferably, the first rectification circuit is a rectification bridge preferably, which is formed by four diodes through every two diodes butted to one another.

Further, as shown in FIG. 3, in one of the embodiments of the present invention, the DC/DC isolation circuit further comprises a current sample circuit, a switch circuit and a control circuit thereof, an isolation transformer, a first rectification circuit, and a voltage sample circuit. Wherein:

The current sample circuit is configured to sample the primary coil current of the isolation transformer.

The voltage sample circuit is configured to sample the output voltage of the DC/DC isolation circuit.

The isolation transformer is configured to store energy and transfer energy, isolate the preceding and subsequent circuit electrically, and vary voltage.

According to the sampled current and voltage, the switch circuit and the control circuit thereof control the timing and the time of turning on and turning off the switches (S1, S2, S3 and S4) in the switch circuit, and further control the output voltage.

The first rectification circuit converts the AC voltage and AC current of the secondary coil of the isolation transformer to be DC voltage and DC current.

Further, the DC/DC isolation circuit further comprises a capacitor energy storage circuit, corresponding filtering and protecting circuit to enhance the reliability of the circuit. Additionally, according to one of the embodiments, the photovoltaic air-conditioning system further comprises a first energy storage capacitor C1, which is electrically connected between the output end of the DC/DC isolation circuit and the second input/output end of the inverter circuit. Specifically, after being electrically connected to the output end of the DC/DC isolation circuit, the first energy storage capacitor C1 is electrically connected to the second input/output end of the inverter circuit. Namely, the positive pole of the first energy storage capacitor C1 is electrically connected to the upper bus of the DC buses, and the negative pole of the first energy storage capacitor C1 is electrically connected to the down bus of the DC buses.

The first energy storage capacitor C1 is electrically connected to the output end of the DC/DC isolation circuit, so as to decrease the noise of the DC power output by the DC/DC isolation circuit and realize the effects of stabilizing the voltage between the upper bus and the down bus of the DC buses.

It should be specified that, in one of the embodiments, the photovoltaic air-conditioning system further comprises a second energy storage capacitor C2, which is electrically connected between the output end of the voltage boost circuit and the input end of the DC/DC isolation circuit. After the DC power is output from the photovoltaic battery and boosted by the voltage boost circuit, and input into the DC/DC isolation circuit, the capacitor C2, as a bypass capacitor of the voltage boost circuit, is provided to decrease the current change in the DC buses, thereby decreasing the noise of the DC voltage output by the voltage boost circuit, and realizing the effects of stabilizing the voltage.

As shown in FIG. 2, in one of the embodiments, the photovoltaic air-conditioning system further comprises a power factor correction circuit and an EMI (Electromagnetic Interference) filter.

The power factor correction circuit is electrically connected between the input end of the compressor inverter and the output end of the rectification circuit. The power factor correction circuit, the rectification circuit and the EMI filter are connected in sequence and then the EMI filter is electrically connected to the grid through the second switch K2.

Additionally, a third energy storage capacitor C3 is electrically connected between the output end of the Power Factor Correction circuit and the input end of the compressor inverter. The third energy storage capacitor C3 is configured to stabilize voltage and make the Power Factor Correction circuit output stable voltage.

It should be specified that, when the photovoltaic air-conditioning system is applied in an air conditioner, there are three working states:

State 1: When the output power of the photovoltaic battery is far larger than the power required for the air conditioner operating, the photovoltaic battery supplies power for both the air conditioner and the grid-connected inverter, namely, the photovoltaic battery simultaneously supplies power and is connected to the grid.

State 2: When the output power of the photovoltaic battery is less than or equal to the power required for the air conditioner operating, both the photovoltaic battery and the grid supply power for the air conditioner, or only the photovoltaic battery supplies power for the air conditioner. Namely, the photovoltaic battery only supplies power but is not connected to the grid.

State 3: When the air conditioner doesn't operate (namely the power required by the air conditioner to operate is zero), the photovoltaic battery is only connected to the grid and the output power is input into the grid.

According to the real-time output power of the solar panel, the air conditioner can control the states of the switch module, thereby enabling the output energy of the solar panel to be used to its full extent.

As shown in FIG. 2, in one of the embodiments, the photovoltaic air-conditioning system of the present invention further comprises a third switch K3.

The third switch K3 is electrically connected between the second input/output end of the inverter circuit and the input end of the compressor inverter, so as to control the connection and disconnection between the photovoltaic battery and the compressor of the air conditioner.

Through providing the third switch K3 between the inverter circuit and the compressor inverter in the photovoltaic air-conditioning system, the power feeding methods are enriched on one hand, namely, through controlling the combination state of the first switch K1, the second switch K2 and the third switch K3, the present invention realizes the switchover of different working states of the photovoltaic air-conditioning system. On the other hand, the fault can be isolated. When a fault occurs in the driving unit of the air conditioner, the driving unit of the air conditioner is isolated from the grid-connected inverter of the photovoltaic battery through controlling the third switch K3 to turn off, therefore, the fault of the driving unit of the air conditioner will not affect the normal operation of the grid connecting and inverting unit; or when a fault occurs in the grid-connecting and inverting unit, it will not affect normal operation of the driving unit of the air conditioner. That is to say, through providing the third switch K3 between the inverter circuit and the compressor inverter in the photovoltaic air-conditioning system and through controlling the third switch K3 to turn off, the other path which has no faults will work normally.

It should be specified that, the first switch K1, the second switch K2 and the third switch K3 are all controllable switches. The combination of the first switch K1, the second switch K2 and the third switch K3 is changed by controlling the first switch K1, the second switch K2 and the third switch K3 to open or close separately, thereby realizing the switchover of different working states of the photovoltaic air-conditioning system.

Specifically, a controller is provided. The controller is electrically connected to the switch module and the third switch K3 respectively, so as to control the input end of the switch module to be conducting or non-conducting with the first output end or the second output end of the switch module, and to control the third switch K3 to close or open.

The present invention should be further specified taking the switch module comprising the first switch K1 and the second switch K2 as an example.

The first switch K1, the second switch K2 and the third switch K3 are separately controlled by the controller, through configuring the controller to be electrically connected to the first switch K1, the second switch K2 and the third switch K3 separately. According to the working state of the photovoltaic air-conditioning system, the controller separately controls the first switch K1, the second switch K2 and the third switch K3 to open or close.

Wherein, the controller is a DSP control chip. The DSP control chip samples the signal of the output power of the photovoltaic battery and the signal of the required power for the air conditioner operation separately, and according to the sampled signal of the output power of the photovoltaic battery and the sampled signal of the required power for the air conditioner, judges the working state of the photovoltaic air-conditioning system to be the state 1, state 2 or the state 3. Then according to the judged state of the photovoltaic air-conditioning system, the DSP control chip controls the first switch K1, the second switch K2 and the third switch K3 to open or close accordingly.

It should be specified that, the first switch K1 and the second switch K2 must not close simultaneously for the reason that the input end of the switch module is not simultaneously conducting with both of the first output end and the second output end of the switch module, which disables the grid-connected circuit and the power factor correction circuit to operate simultaneously, thereby avoiding mutual influences between the grid-connecting and inverting unit and the power factor correction circuit.

More specifically:

According to the sampled signal of the output power of the photovoltaic battery and the sampled signal of the required power for the air conditioner operation, if the controller judges that the output power of the photovoltaic battery is far larger than the required power for the air conditioner and that the working state of the photovoltaic air-conditioning system is state 1, the combined state of the control switch of the controller is: the first switch K1 is turned off, the second switch K2 is turned on, and the third switch K3 is turned off. The photovoltaic battery simultaneously supplies power and is connected to the grid.

At this moment, as the second switch K2 is off, the rectification circuit and the power factor correction circuit are completely disconnected from the grid, thereby disconnecting the N (Neutral) wire and the L (Live) wire of the input of the rectification circuit from the grid completely; the down bus of the DC buses and the N wire or the L wire of the grid will not constitute a loop circuit, thereby preventing the grid-connected inverter current from flowing into the down bus through the rectification circuit, and ensuring the N wire current and the L wire current output from the inverter circuit to be equal.

According to the sampled signal of the output power of the photovoltaic battery and the sampled signal of the required power for the air conditioner operation, if the controller judges that the output power of the photovoltaic battery is less than or equal to the required power for the air conditioner and that the working state of the photovoltaic air-conditioning system is state 2, the combined state of the control switches of the controller is: the first switch K1 is turned off, the second switch K2 is turned on, and the third switch K3 is turned on. Passing through the voltage boost circuit and the DC/DC isolation circuit, the DC power output from the photovoltaic battery is directly input into the compressor inverter; then the compressor inverter converts the DC power to AC power required for controlling the speed of the compressor motor, thereby realizing the effect that the photovoltaic battery directly supplies power for the air conditioner operation. Simultaneously, the AC power output from the grid flows through and is filtered by the EMI filter; then the AC power output from the grid is rectified by the rectification circuit to be DC power. After the Ac power output from the grid is converted to be DC power, the DC power is input into the power factor correction circuit. After being regulated to be the same frequency and the same phase by the power factor correction circuit, the current input from the grid and the grid voltage are input into the compressor inverter; then the compressor inverter converts the DC power to AC power required for controlling the speed of the compressor motor, thereby realizing the effect that the grid supplies power for the air conditioner operation.

According to the sampled signal of the output power of the photovoltaic battery and the sampled signal of the power required for the air conditioner operation, if the controller judges that the working state of the photovoltaic air-conditioning system is state 3, the combined state of the control switch of the controller is: the first switch K1 is turned on, the second switch K2 is turned off, and the third switch K3 is turned off. At this moment, the photovoltaic battery only supplies power for the inverter circuit, and the inverter circuit transfers the electrical power output from the photovoltaic battery to the grid, thereby connecting the photovoltaic battery to the grid. When the photovoltaic battery is only connected to the grid, the second switch K2 is turned on, thereby preventing the grid-connected inverter current from flowing into the down bus through the rectification circuit, and ensuring the N wire current and the L wire current output from the inverter circuit to be equal.

Through the combination state of the first switch K1, the second switch K2 and the third switch K3, the present invention realizes the switchover of different working states of the photovoltaic air-conditioning system, and achieves the maximum utilization of photovoltaic energy. Additionally, as the first switch K1 and the second switch K2 will not close simultaneously, the present invention avoids the mutual influences between the grid-connected inverter and the power factor correction circuit, and ensures normal control for the grid-connected inverter current.

It should be specified that the controller may be an integrated circuit comprising a comparator. The comparator compares the power output by the photovoltaic battery with the power required for the air conditioner operation and judges the working state of the photovoltaic air-conditioning system, and controls the first switch K1, the second switch K2 and the third switch K3 to open or close accordingly, thereby realizing the switchover of different working states of the photovoltaic air-conditioning system, and achieving the maximum utilization of photovoltaic energy.

Additionally, it should be specified that the present invention further provides a photovoltaic air conditioner, which comprises any one of the photovoltaic air-conditioning systems above. Any one of the photovoltaic air-conditioning systems above is applied in the photovoltaic air conditioner, which prevents the ground leakage current of the photovoltaic battery from being superposed with the motor shaft current of the compressor of the air conditioner, thereby avoiding increment of the motor shaft current of the compressor and improving the safety and reliability of the photovoltaic air conditioner.

What described above are several embodiments of the present invention, and they are specific and in details, but not intended to limit the scope of the present invention. It will be understood by those skilled in the art that various modifications and improvements can be made without departing from the conception of the present disclosure, and all these modifications and improvements are within the scope of the present invention. Therefore, the scope of the present invention should be defined by the accompanying claims.

What is claimed is:

1. A photovoltaic air-conditioning system, comprising a photovoltaic battery, a switch assembly, an inverter circuit, a rectification circuit and a compressor inverter, wherein,
   the switch assembly comprises an input end, a first output end and a second output end;
   an input end of the switch assembly is electrically connected to a power grid;
   a first output end of the switch assembly is electrically connected to a first input/output end of the inverter circuit;
   a second output end of the switch assembly is electrically connected to an input end of the rectification circuit;
   an output end of the photovoltaic battery is electrically connected to a second input/output end of the inverter circuit;
   an output end of the rectification circuit is electrically connected to an input end of the compressor inverter;
   the input end of the switch assembly is not simultaneously conducting with both of the first output end and the second output end of the switch assembly;
   when the input end of the switch assembly is conducting with the first output end of the switch assembly, the power grid is connected to the photovoltaic battery;
   when the input end of the switch assembly is conducting with the second output end of the switch assembly, the power grid is connected to a compressor of an air conditioner;
   wherein, the switch assembly comprises a first switch and a second switch;
   one end of the first switch and one end of the second switch, both of which are configured to be input ends of the switch assembly, are connected electrically with the power grid;
   another end of the first switch, which is configured to be the first output end of the switch assembly, is electrically connected to the first input/output end of the inverter circuit;
   another end of the second switch, which is configured to be the second output end of the switch assembly, is electrically connected to the input end of the rectification circuit;
   wherein the system comprises a third switch,
   wherein, the third switch is electrically connected between the second input/output end of the inverter circuit and the input end of the compressor inverter;
   wherein the system comprises a controller;
   wherein the controller is electrically connected to the switch assembly and the third switch respectively, and is configured to control the input end of the switch assembly to be conducting or non-conducting with the first output end or the second output end of the switch assembly, and to control the third switch to close or open.

2. The photovoltaic air-conditioning system according to claim 1, wherein, the switch assembly comprises a single-pole double-throw switch;
   a common end of the single-pole double-throw switch acts as the input end of the switch assembly and is connected to the grid;
   a first fixed contact of the single-pole double-throw switch acts as the first output end of the switch assembly and is electrically connected with the first input/output end of the inverter circuit;
   a second fixed contact of the switch assembly acts as the second output end of the switch assembly and is electrically connected to the input end of the rectification circuit.

3. The photovoltaic air-conditioning system according to claim 1, further comprising a voltage boost circuit and a DC/DC isolation circuit, wherein, an input end of the voltage boost circuit is electrically connected with an output end of the photovoltaic battery;
the DC/DC isolation circuit is electrically connected between the output end of the voltage boost circuit and a second input/output end of the inverter circuit.

4. The photovoltaic air-conditioning system according to claim 3, wherein, the DC/DC isolation circuit comprises an isolation transformer;
a primary coil of the isolation transformer is electrically connected to the output end of the voltage boost circuit;
a secondary coil of the isolation transformer is electrically connected to the second input/output end of the inverter circuit.

5. The photovoltaic air-conditioning system according to claim 3, further comprising a power factor correction circuit, wherein, the power factor correction circuit is electrically connected between the input end of the compressor inverter and the output end of the rectification circuit.

6. The photovoltaic air-conditioning system according to claim 5, further comprising a first energy storage capacitor, a second energy storage capacitor and a third energy storage capacitor, wherein,
the first energy storage capacitor is electrically connected between an output end of the DC/DC isolation circuit and a second input/output end of the inverter circuit;
the second energy storage capacitor is electrically connected between the output end of the voltage boost circuit and an input end of the DC/DC isolation circuit;
the third energy storage capacitor is electrically connected between the output end of the power factor correction circuit and the input end of the compressor inverter.

7. A photovoltaic air conditioner, comprising the photovoltaic air-conditioning system defined in claim 1.

8. The photovoltaic air-conditioning system according to claim 2, further comprising a third switch, wherein, the third switch is electrically connected between the second input/output end of the inverter circuit and the input end of the compressor inverter.

9. The photovoltaic air-conditioning system according to claim 8, further comprising a controller;
the controller is electrically connected to the switch assembly and the third switch respectively, and is configured to control the input end of the switch assembly to be conducting or non-conducting with the first output end or the second output end of the switch assembly, and to control the third switch to close or open.

10. The photovoltaic air conditioner according to claim 7, wherein the switch assembly comprises a first switch and a second switch;
one end of the first switch and one end of the second switch, both of which are configured to be input ends of the switch assembly, are connected electrically with the power grid;
another end of the first switch, which is configured to be the first output end of the switch assembly, is electrically connected to the first input/output end of the inverter circuit;
another end of the second switch, which is configured to be the second output end of the switch assembly, is electrically connected to the input end of the rectification circuit.

11. The photovoltaic air conditioner according to claim 7, wherein, the switch assembly comprises a single-pole double-throw switch;
a common end of the single-pole double-throw switch acts as the input end of the switch assembly and is connected to the grid;
a first fixed contact of the single-pole double-throw switch acts as the first output end of the switch assembly and is electrically connected with the first input/output end of the inverter circuit;
a second fixed contact of the switch assembly acts as the second output end of the switch assembly and is electrically connected to the input end of the rectification circuit.

12. The photovoltaic air conditioner according to claim 10, wherein, the photovoltaic air-conditioning system further comprises a third switch, the third switch is electrically connected between the second input/output end of the inverter circuit and the input end of the compressor inverter.

13. The photovoltaic air conditioner according to claim 7, wherein, the photovoltaic air-conditioning system further comprises a voltage boost circuit and a DC/DC isolation circuit, an input end of the voltage boost circuit is electrically connected with an output end of the photovoltaic battery;
the DC/DC isolation circuit is electrically connected between the output end of the voltage boost circuit and a second input/output end of the inverter circuit.

14. The photovoltaic air conditioner according to claim 13, wherein, the DC/DC isolation circuit comprises an isolation transformer;
a primary coil of the isolation transformer is electrically connected to the output end of the voltage boost circuit;
a secondary coil of the isolation transformer is electrically connected to the second input/output end of the inverter circuit.

15. The photovoltaic air conditioner according to claim 13, wherein, the photovoltaic air-conditioning system further comprises a power factor correction circuit, the power factor correction circuit is electrically connected between the input end of the compressor inverter and the output end of the rectification circuit.

16. The photovoltaic air conditioner according to claim 12, wherein, the photovoltaic air-conditioning system further comprises a controller;
the controller is electrically connected to the switch assembly and the third switch respectively, and is configured to control the input end of the switch assembly to be conducting or non-conducting with the first output end or the second output end of the switch assembly, and to control the third switch to close or open.

17. The photovoltaic air conditioner according to claim 15, wherein, the photovoltaic air-conditioning system further comprises a first energy storage capacitor, a second energy storage capacitor and a third energy storage capacitor, wherein,
the first energy storage capacitor is electrically connected between an output end of the DC/DC isolation circuit and a second input/output end of the inverter circuit;
the second energy storage capacitor is electrically connected between the output end of the voltage boost circuit and an input end of the DC/DC isolation circuit;
the third energy storage capacitor is electrically connected between the output end of the power factor correction circuit and the input end of the compressor inverter.

* * * * *